(12) United States Patent
Chirol et al.

(10) Patent No.: US 11,208,275 B2
(45) Date of Patent: Dec. 28, 2021

(54) CENTRALIZED METHOD OF PALLETIZING ARTICLES AT THE OUTLETS OF PRODUCTION LINES

(71) Applicant: SOLYSTIC, Bagneux (FR)

(72) Inventors: Luc Chirol, Paris (FR); Emmanuel Miette, Saint Gratien (FR)

(73) Assignee: SOLYSTIC, Bagneux (FR)

( * ) Notice: Subject to any disclaimer, the term of this patent is extended or adjusted under 35 U.S.C. 154(b) by 516 days.

(21) Appl. No.: 16/339,141

(22) PCT Filed: Dec. 11, 2018

(86) PCT No.: PCT/FR2018/053201
§ 371 (c)(1),
(2) Date: Apr. 3, 2019

(87) PCT Pub. No.: WO2019/115930
PCT Pub. Date: Jun. 20, 2019

(65) Prior Publication Data
US 2021/0354917 A1 Nov. 18, 2021

(30) Foreign Application Priority Data
Dec. 15, 2017 (FR) ..................................... 1762205

(51) Int. Cl.
*B65G 57/22* (2006.01)
*B65G 57/16* (2006.01)
(Continued)

(52) U.S. Cl.
CPC ............ *B65G 57/22* (2013.01); *B25J 9/1687* (2013.01); *B65G 1/0492* (2013.01); *B65G 57/02* (2013.01);
(Continued)

(58) Field of Classification Search
CPC ...................................................... B65G 57/22
See application file for complete search history.

(56) References Cited

U.S. PATENT DOCUMENTS 5,501,571 A * 3/1996 Van Durrett ....... G05B 19/4189
414/801
7,266,422 B1 * 9/2007 DeMotte ................ B65G 61/00
700/217

(Continued)

FOREIGN PATENT DOCUMENTS

DE 202012002614 U1 3/2012
EP 3 162 743 A1 5/2017

*Primary Examiner* — Thomas Randazzo
(74) *Attorney, Agent, or Firm* — Ware, Fressola, Maguire & Barber LLP

(57) ABSTRACT

Shuttle robots (107) are used that are suitable for moving trolleys (106, 106') under the control of a monitoring and control unit (190) for handling objects so as to move them from a collection point (110) to a palletizing station (151) remote from the collection point, the shuttle robots being autonomously movable and being suitable for hitching to and unhitching from the trolleys, the monitoring and control unit controls the shuttle robots so that they move the objects on trolleys from the collection point to a buffer storage zone (141) where the articles on the trolleys are grouped together into batches of articles for palletizing, and the monitoring and control unit controls the shuttle robots so that they take the objects on trolleys grouped together in batches from the buffer storage zone and move them in sequence to the palletizing station.

7 Claims, 2 Drawing Sheets

(51) Int. Cl.
  *B65G 57/20* (2006.01)
  *B65G 57/02* (2006.01)
  *B65G 1/04* (2006.01)
  *B65G 61/00* (2006.01)
  *G05B 19/418* (2006.01)
  *B65G 63/00* (2006.01)
  *B65G 57/03* (2006.01)
  *B25J 9/16* (2006.01)

(52) U.S. Cl.
  CPC ............ *B65G 57/03* (2013.01); *B65G 57/16* (2013.01); *B65G 57/20* (2013.01); *B65G 61/00* (2013.01); *B65G 63/002* (2013.01); *G05B 19/4189* (2013.01); *B65G 2201/0267* (2013.01); *G05B 2219/31008* (2013.01)

(56) References Cited

U.S. PATENT DOCUMENTS

| | | | |
|---|---|---|---|
| 2008/0131255 A1* | 6/2008 | Hessler | B65G 1/1378 414/788.1 |
| 2008/0167884 A1 | 7/2008 | Mountz et al. | |
| 2010/0221094 A1* | 9/2010 | Kuehnemann | B65G 61/00 414/788 |
| 2013/0282165 A1* | 10/2013 | Pankratov | B65G 57/09 700/217 |
| 2015/0073589 A1 | 3/2015 | Khodl et al. | |
| 2018/0029797 A1* | 2/2018 | Hance | B25J 19/023 |
| 2018/0068255 A1* | 3/2018 | Hance | G06Q 10/0838 |
| 2018/0208398 A1* | 7/2018 | Haveman | B66F 9/24 |
| 2019/0016543 A1* | 1/2019 | Turpin | B25J 19/023 |

\* cited by examiner

200

CENTRALIZED METHOD OF PALLETIZING ARTICLES AT THE OUTLETS OF PRODUCTION LINES

CROSS REFERENCE TO RELATED APPLICATIONS

This application is the U.S. National Stage of International Application Number PCT/FR2018/053201 filed on Dec. 11, 2018, which application claims priority under 35 USC § 119 to French Patent Application No. 1762205 filed on Dec. 15, 2017. Both applications are hereby incorporated by reference in their entirety.

TECHNICAL FIELD

The invention lies in the field of logistics, and more precisely in the field of palletizing objects at the outlets of production lines onto storage pallets, where the objects may in particular be intermediate products in a production process or mailpieces such as parcels.

PRIOR ART

For transport purposes, objects coming from production lines in parallel are frequently stored on pallets immediately at the outlets from those lines, each line having its own system for performing the palletizing operation.

Palletizing, i.e. the operation of storing objects on pallets, is little automated because the costs and drawbacks of existing automation solutions are burdensome.

For example, in the palletizing system described in patent Document EP 3 162 743, the floor area occupied by the infrastructure for handling the objects that are produced, or indeed the dust that pallets bring in to production workshops, are drawbacks that can be completely unacceptable in certain situations.

It is particularly difficult to automate palletizing stations profitably since each of them is dedicated to a given production line, and depending on the rate at which objects are produced by their respective lines, they can be inactive for much of the time while waiting for objects that are being produced.

Patent application US 2008/0167884 discloses a method of preparing orders for articles that make use of movable devices for storing articles and movable units for moving those devices.

SUMMARY OF THE INVENTION

An object of the invention is to improve the handling of objects at the ends of production lines in order to palletize them, to improve palletizing operations proper, and in particular to reduce the infrastructure and the floor area needed for those purposes.

Another object of the invention is to improve the occupancy rate of a palletizing station downstream from lines producing objects that are to be palletized.

To this end, the invention provides a method of palletizing objects, in which use is made of shuttle robots suitable for moving trolleys under the control of a monitoring and control unit in order to handle the objects to a palletizing station where the objects are stowed on a pallet, the method being characterized in that the palletizing station is shared between a plurality of production lines for producing the objects, which objects are packaged in rectangular box shapes, and in that it further comprises the following steps:

using the shuttle robots to move the objects for processing on distribution trolleys from the outlets of the production lines so as to place them in a transshipment station where each object is trans-shipped from a distribution trolley to an accumulation trolley on which the object is stacked on other externally identical rectangular box shaped objects that are to be palletized on the same pallet;

using the shuttle robots under the control of the monitoring and control unit to move the accumulation trolleys full of stacked objects to a buffer storage zone where the identical rectangular box shaped objects on the accumulation trolley are grouped together by batches in shuttle robot travel aisles, the objects of a batch being for stowing on the same pallet; and preparing a palletizing plan by means of the monitoring and control unit when it is detected that all of the objects making up a batch to be palletized are stacked on one or more accumulation trolleys situated in the buffer storage zone, and once said palletizing plan has been prepared, moving said accumulation trolleys carrying the objects of the batch for palletizing from the buffer storage zone in order to stow them on a pallet.

In this method, the infrastructure needed for handling objects and the associated floor area can be reduced considerably since, by way of example, fixed conveyors are not essential, and both the operations and the equipment can easily be redirected to new needs or to new priorities.

The invention may advantageously present the following features:

said objects may be handled by the shuttle robots between a plurality of collection points adjacent to said production lines and the palletizing station, which is common to said collection points;

the monitoring and control unit may control the shuttle robots to move the objects from one of the collection points to a transshipment station where the objects are trans-shipped from one trolley onto another trolley suitable for carrying a plurality of objects in a stack;

the monitoring and control unit may control the shuttle robots to move said other trolleys loaded with respective stacks of objects from the transshipment station to the buffer storage zone;

said objects are articles packaged in boxes at each collection point;

pallets of different types are placed in a pallet waiting position adjacent to the palletizing station;

in accordance with sorting data, the monitoring and control unit determines a type of pallet that is adapted to palletizing a batch of objects on a pallet; and in response to that detection, the monitoring and control unit instructs a pallet corresponding to the determined pallet type to be moved from the pallet waiting position to a pallet loading position of the palletizing station.

BRIEF SUMMARY OF THE DRAWINGS

The present invention can be better understood and other advantages appear on reading the following detailed description of an embodiment taken by way of non-limiting example and shown in the accompanying drawings, in which.

DESCRIPTION OF AN EMBODIMENT

The embodiment is shown in FIGS. 1A to 1E, and 2.

In one aspect, in a factory for producing objects, the invention provides a method of sharing a palletizing station 151 situated downstream from production lines 105 for producing articles 102 by automating at least some of the article movement and handling operations by means of shuttle robots moving trolleys, thereby also serving to reduce the size of the infrastructure that is dedicated to handling the articles.

One possible arrangement of a system 100 for handling and palletizing objects and suitable for performing an object palletizing method of the invention is shown in FIGS. 1A to 1E.

Figure 1A:
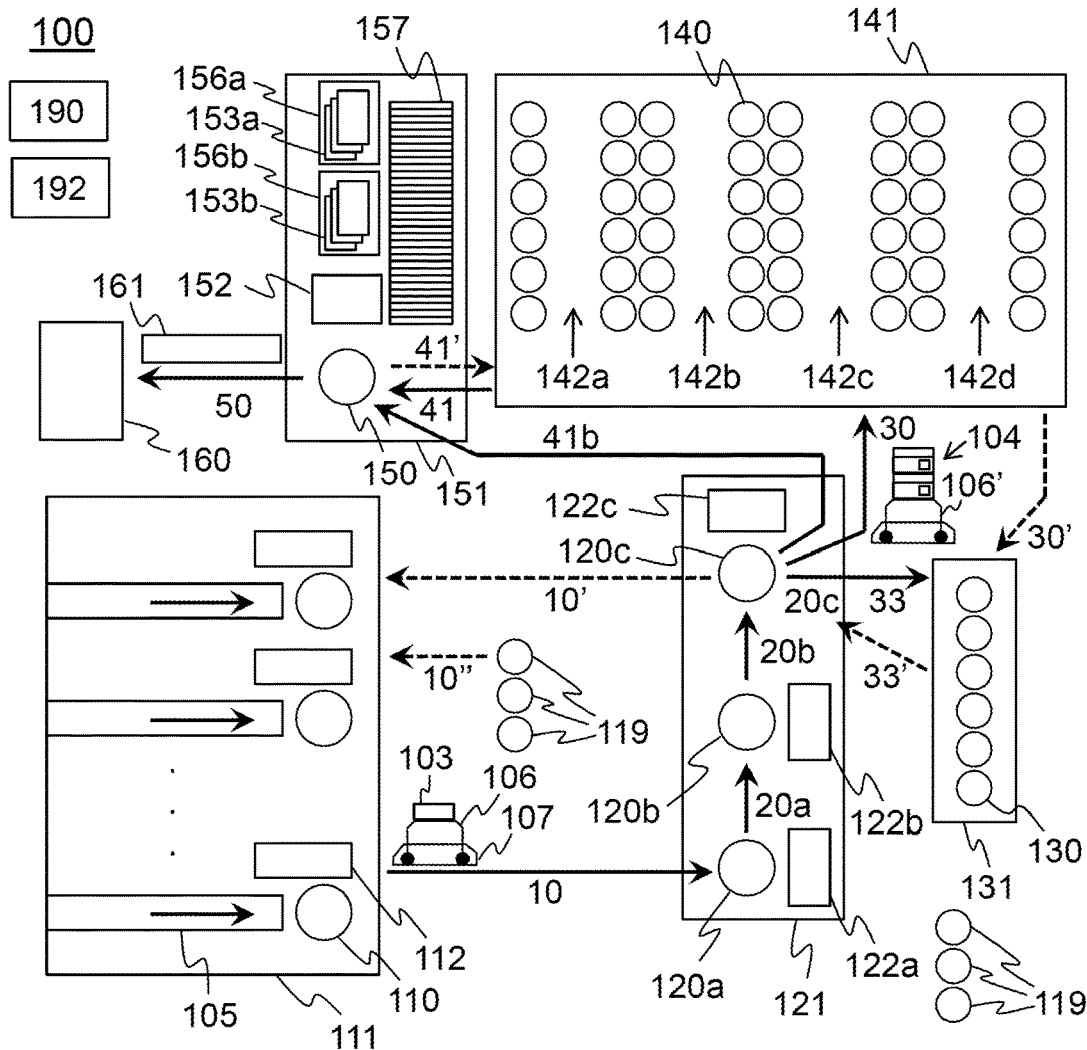
FIG. 1A shows an example of a system for handling objects in order to palletize them, the system being capable of performing the method of the invention.
Figure 1B:
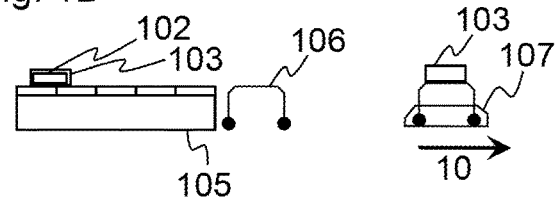
FIGS. 1B to 1E show operations performed by the FIG. 1A system.

As shown in FIGS. 1A and 1B, production lines 105 produce objects, constituted in this example by articles 102 packaged in containers 103, which containers may be of rectangular box shape and thus easy to stack, typically being cardboard boxes.

FIGS. 1A and 1B show the situation of production lines that produce packaged articles directly, however the situation in which articles are packaged in a packaging station downstream from the production lines also comes within the invention.

Collection points 110, in the form of distribution reception stations adjacent to the outlets of the production lines are configured to receive distribution trolleys 106, such as wheeled trolleys, so that objects can be loaded onto the distribution trolleys, directly or by handler means 112 such as a system comprising a robot arm and its gripper, for example.

Means for positioning objects on the trolleys may be used with each line, e.g. a pusher device that is integrated at the outlet of the production line.

The distribution trolleys 106 and shuttle robots 107 are designed so that the shuttle robots 107 can hitch to, move, and unhitch from the trolleys 106 in autonomous manner.

Downstream from the production lines 105, there is a container closing station 120a configured to close the containers, which operation may be performed manually by a human operative or by an automatic device 122a, e.g. by putting a lid 123a into place (shown in FIG. 1C), or by folding down flaps forming parts of the containers.

Figure 1C:
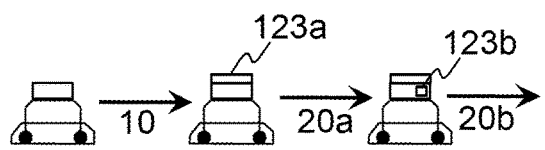

Downstream from the closing station, there is a labeling station 120b configured to affix a label 123b, as shown in FIG. 1C, on each container, which operation may be performed manually by a human operative, or else by an automatic device 122b.

Downstream from the labeling station there is a trans-shipment station 120c configured to trans-ship the objects from the distribution trolleys 106 onto accumulation trolleys 106', which trolleys can be associated with the shuttle robots in a manner similar to the distribution trolleys 106.

Figure 1D:
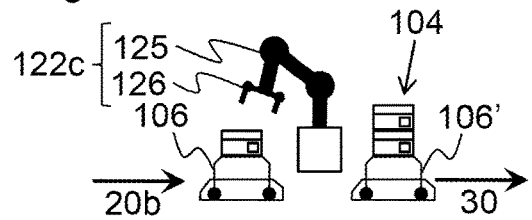

The transshipment station may also be configured to build stacks 104 of objects that are identical or mutually compatible on the accumulation trolley 106', which operation may be performed by a human operative, or else by an automatic handler device 122c, e.g. a robot arm 125 and its gripper 126, as shown in FIG. 1D.

Intermediate reception stations 130 for receiving accumulation trolleys 106' are preferably located in the proximity of the transshipment station 120c in an intermediate waiting zone 131.

The object handling system may optionally have a plurality of closing stations operating in parallel, a plurality of labeling stations operating in parallel, and/or a plurality of transshipment stations operating in parallel.

Storage reception stations 140 for receiving accumulation trolleys 106' that are empty or full are located in a buffer storage zone 141.

In general manner, the reception stations may merely be locations on the floor, optionally associated with marking and/or accessories for holding trolleys and/or shuttle robots.

The palletizing station 151 may include a stowing system 152 for stowing objects on a storage pallet 153, unstackers 156a and 156b for unstacking empty pallets 153a and 153b of various types, a conveyor 157 for bringing empty pallets from the unstackers to a pallet-loading position 150, and a conveyor 161 for taking loaded pallets to a wrapping device 160 for wrapping the loaded pallets.

Figure 1E:
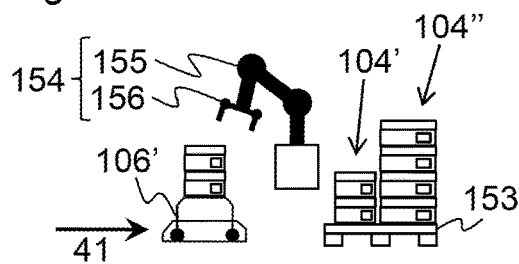
Figure 2:
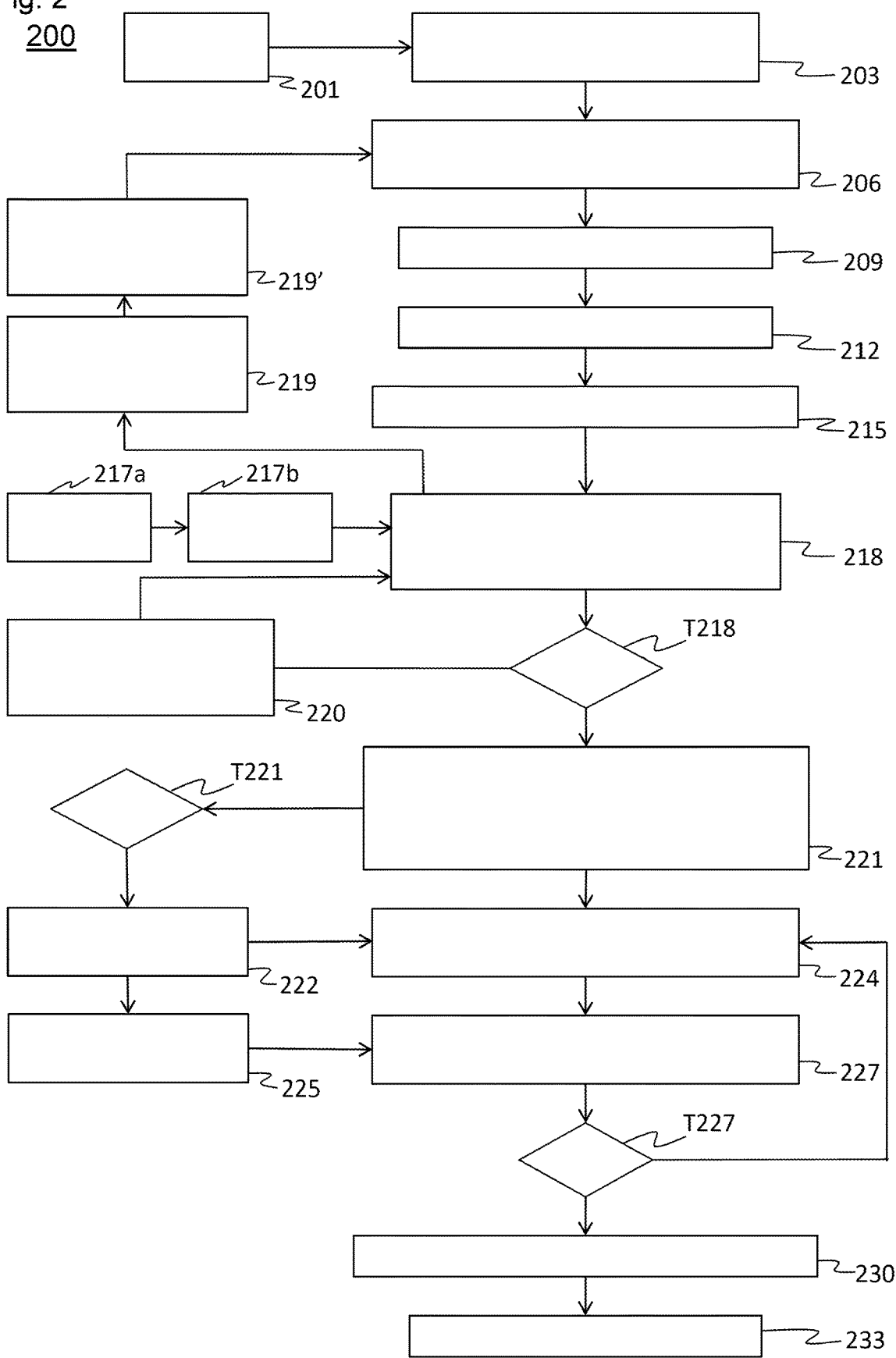
FIG. 2 shows the steps of a method of the invention for handling objects that are to be palletized, which method can be implemented by the FIG. 1A system.

The container stowage system 152 may be a manual system for stowage by a human operative, however it preferably comprises an automatic system 154, e.g. comprising a robot arm 155 and its gripper 156, as shown in FIG. 1E.

A fleet of shuttle robots controlled by a monitoring and control system 190 is made up of shuttle robots 107 that are capable of moving the distribution trolleys 106 and the accumulation trolleys 106' between the reception stations and the processing stations along paths that may be predetermined and/or that may be determined by the monitoring and control system.

By way of example, the shuttle robots may be electric vehicles having a battery and a trolley-hitching system, and they may be controlled by the monitoring and control system by wireless communication.

The monitoring and control system 190 comprises an information processor device such as a processor, an information storage device such as a computer memory, and wired or wireless communication means for communicating with the other elements of the object handling and palletizing system 100, and in particular with a database 192 that stores object identification and palletizing data, with means for controlling the advance of objects on the production lines to the pallet loading position, with the shuttle robots, and with the stations and/or automatic devices for processing and/or handling containers.

The monitoring and control system is configured in particular to feed and refresh the database so as to keep data up to date about the streams of objects that have been produced or that are to be produced by the production lines, together with the position of each object in the handling system, the numbers and the types of objects carried by each trolley, and the positions and loading capacities of each of the trolleys, in order to determine a palletizing plan specifying the order in which objects should be presented to the palletizing station for a given batch of objects and the type of pallet that is appropriate for each batch of objects, in compliance with data about the sorting performed on the objects.

The object handling system suitable for performing the above-described palletizing method may be operated using a method 200.

The palletizing method 200 is shown in FIGS. 1A to 1E and 2 and is described below by following the path of an object (as constituted in this example by an article 102 contained in a container 103) starting from the outlet of one of the production lines 105 until it is dispatched to its destination.

In this embodiment, shuttle robots 107 are used that are suitable for moving the trolleys 106 and 106' under the control of a monitoring and control unit 190 in order to handle the objects 102 and/or 103 between a collection point 110 and a palletizing station 151 that is remote from the collection point, said shuttle robots being autonomous in terms of movement and being capable of hitching to a trolley in order to move it, and of unhitching therefrom.

In this particular embodiment, the collection point may be one of the distribution reception stations 110 adjacent to the outlets of the distribution lines 105, however they could equally well be downstream from an object packaging station.

The palletizing station is considered to be remote from the outlets of the production lines, which means that an object conveyor system needs to be installed for taking the objects leaving the production lines and moving them to the palletizing station so that they travel over a distance or pass through an opening in a partition or a wall, or indeed in order to cause the objects to pass via object processing stations as described in detail below prior to bringing those objects to the palletizing station.

Furthermore, the objects are handled by the shuttle robots between a plurality of collection points, which in this example are distribution reception stations, and the palletizing station that is common to said collection points, i.e. the palletizing station is shared between the production lines.

Because the palletizing station is shared, its occupancy rate can be increased compared with the situation in which each production line is associated with a palletizing station that is dedicated thereto and that can thus find itself in a waiting situation, e.g. if the production line is stopped or if the stream of objects reaching the outlets of the production lines is not sufficient to keep the station active continuously.

In particular, during a step 201, sorting data is allocated to the object that is constituted by at least one article 102 and its container 103.

This data may specify one or more characteristics of the object, such as whether it is fragile, its weight, whether it needs to be refrigerated, the type of the article and/or of the container, such as the material and the shape of the container, a destination or storage address, a number of a batch to which the object belongs, or any other category as may be defined, e.g. by a supplier, a recipient, a manufacturer, or a transporter.

During a step 203, the object, i.e. the container 103 containing at least one article 102, comes to the end of said production line.

During a step 206, the object is loaded onto a distribution trolley 106 that was waiting at a distribution reception station 110 adjacent to an outlet of said production line, and a shuttle robot 107 under the control of the monitoring and control system 190 hitches itself to said distribution trolley.

The shuttle robot coming to take the object loaded on a trolley may also be controlled so as to bring an available trolley to the distribution reception station 110 and to unhitch itself therefrom in order to hitch itself to the trolley that is loaded with the object.

During a step 209, the loaded distribution trolley is moved by the shuttle robot from an outlet zone 111 of the production lines 105 along a path 10 in order to present the object to a closing station 120a where the container is closed, possibly by an automatic device 122a.

FIG. 1B shows a trolley 106 at a distribution reception station 110 at the end of a production line 105, together with an object (represented in this example by its container 103) on the trolley and being moved along the path 10 by a shuttle robot 107, in compliance with the sorting data.

Before or after the object is moved on the trolley from the outlet of the production line, e.g. during one of the steps 203, 206, and 209, the monitoring and control system may also, by way of example, instruct an available shuttle robot to move an available trolley from a waiting position 119 to the distribution reception station along a path 10" so as to replace the trolley that is about to be moved or that has already been moved.

Alternatively, a trolley waiting in the storage zone 141 may be used.

During a step 212, the distribution trolley is moved by a shuttle robot along a path 20a in order to present the closed container to a labeling station 120b where a label, as produced automatically in compliance with the sorting data, is affixed to the container by an automatic device 122b, or manually by a human operative.

FIG. 1C shows a container 103 on a trolley moved by shuttle robots progressing along the path 10, 20a, and 20b, where it is provided with a closed lid 123a, and with a label 123b during the steps 209 and 212.

During a step 215, the distribution trolley is moved along a path 20b by the shuttle robot to a transshipment station 120c.

Between the object arriving at the end of the production line and the labeled container being presented to the distribution station, an empty or already partially loaded accumulation trolley 106' waiting at an intermediate reception station 130 is transferred to said transshipment station 120c by a shuttle robot, e.g. following a path 33'.

The use of the intermediate reception station, situated in the proximity of the transshipment station 120c, seeks to optimize the presentation times of the accumulation trolleys 106' at the transshipment station, and thus limit the waiting times of the trolleys at the The accumulation trolley 106' could equally well come directly from a waiting station 119 or from the buffer storage zone 141.

In particular, during a step 217a, the monitoring and control unit may determine the type of the object from the sorting data, and then in response to making that determination, it can act during a step 217b to detect, in the intermediate waiting zone 131, an accumulation trolley that is partially loaded with a stack of objects of the determined type and instruct a shuttle robot to take the detected trolley to the transshipment station.

Said intermediate distribution station 130 may receive accumulation trolleys partially loaded with stacks of containers that contain articles of different types, with each stack preferably being made up of identical containers containing articles that are identical, or else it may receive empty trolleys.

Alternatively, the containers forming a stack are preferably mutually identical, but may contain articles of different types, the important point being that it is possible to build up stacks of containers that are stable.

It should be understood that containers are considered to be mutually identical when they are identical externally concerning their outside shapes and their outside dimensions, since those are criteria that determine whether it is possible to stack those containers in stacks that are stable.

During a step 218, the labeled container is trans-shipped in compliance with the sorting data from the distribution trolley 106 onto an accumulation trolley 106' at the transshipment station 120c, possibly by means of an automatic device 122c associated with the transshipment station, as shown in FIG. 1D.

Beforehand, and in response to the sorting data, the transshipment station 120c forms stacks of identical containers 103 on the accumulation trolleys 106', which containers contain articles of the same type, by stacking an incoming container on one or more already-present containers on the accumulation trolleys, with this being done manually by a human operative, or else by an automatic device 124, e.g. a robot arm 125 having a gripper 126.

Alternatively, identical containers may contain objects of different types, the advantage being that it is then easy to form stacks of batches that are not uniform, i.e. batches containing objects that are different from one another.

During a step 219, a shuttle robot takes the distribution trolley from which the labeled container has been removed directly or otherwise to an available distribution reception station 110.

The unloaded distribution trolley may be taken to a distribution station via a waiting zone 119 during a step 219', e.g. if all of the distribution reception stations are already occupied.

During a test step T218 following the transshipment in step 218, the monitoring and control unit detects whether the accumulation trolley is still not full after the container has been trans-shipped, in which case it is transferred along a path 33 to an intermediate reception station 130 of an intermediate zone 131 during a step 220; if the accumulation trolley was already waiting at a reception station of the intermediate zone 131 prior to being transferred to the transshipment station 120c, it may for example be returned to the reception station where it was previously waiting.

A reception station 130 of the intermediate waiting zone 131 may be dedicated to a particular type of container and/or of content, or to a particular production line, thus making it easier to monitor that operations are being carried out properly, in particular if the monitoring is performed by a human operative.

If, during the test step T218, the accumulation trolley is found to be full after transshipment of the container, then it is transferred to a storage reception station 140 in the storage zone 141 along a path 30 during a step 221, so that the objects are grouped together in the storage zone.

Furthermore, in response to the result of the test, an empty accumulation trolley may be transferred along a path 30' from a waiting zone 119 or from a storage reception station 140 to the intermediate reception station from which the accumulation trolley originated in order to replace it.

In this document, a full trolley is a trolley that is loaded to the maximum of its capacity or a trolley that is loaded with sufficient objects to finish off a batch for palletizing, so, by way of example, the "full" nature of a trolley may be determined from the data stored in the database of the monitoring and control system.

During a test step T221, when, in response to the sorting data and the updated status of the trolley (location, types and quantities of loaded objects), the control and monitoring system detects that all of the objects making up a batch that is to be palletized are stacked on one or more accumulation trolleys situated in storage reception stations, said batch of objects can be considered as being ready for the palletizing operation to be performed by the palletizing station, and this operation can be started.

Alternatively, the palletizing operation can be started before all of the containers making up the batch are stacked on accumulation trolleys situated at storage reception stations.

Specifically, during that test step T221, the monitoring and control system may have access to data about the production streams on the production lines and about the times needed for transferring containers from the production lines to the palletizing station, and it may optionally anticipate preparing the objects of a given batch and their presentation to the palletizing station by starting a palletizing operation for the objects of the given batch that are ready for palletizing before all of the objects of that batch have reached the buffer storage zone, thereby accelerating operation without the palletizing system embarking on a period of waiting for batches that are not yet ready for palletizing.

In such a situation, the objects finishing off the batch may be transferred to the palletizing station without passing through the storage zone, e.g. following a path 41b going from the transshipment station 120c to the pallet loading station 150 without passing via the buffer storage zone 141.

By way of example, this anticipated palletizing operation may be started when other operations are not planned at the same time for the palletizing station.

Under all circumstances, in response to the test step T221, the monitoring and control system acts during a step 222 to prepare a palletizing plan based on the sorting data, which may in particular indicate the type of pallet that is to be used and the order in which the accumulation trolleys loaded with containers making up the batch for palletizing are to be presented to the palletizing station.

During steps 209, 212, 215, and 221 in this particular implementation, the monitoring and control unit controls the shuttle robots to move the objects on trolleys, said objects constituting objects that are packaged in containers, from the collection points, specifically a distribution reception station, to a buffer storage zone where the objects on trolleys are grouped together in batches of objects for palletizing.

Naturally, it is not essential for all of the stations to be served systematically, and depending on circumstances, objects may be taken directly to the buffer storage zone or they may be taken via one, two, or three of the stations, or via other stations that are not described herein, depending on needs.

Once the objects forming a batch of objects for palletizing are grouped together within the buffer storage zone, the monitoring and control unit controls the shuttle robots to take the objects on trolleys that are grouped together in batches in the buffer storage zone so as to move them in sequence to the palletizing station.

In particular, during a step 224, an accumulation trolley 106' is transferred along a path 41 from one of the storage stations 140 so as to be presented to the palletizing station 150 by a shuttle robot in response to the palletizing plan.

Thus, during the steps 206, 209, 212, 215, 218, and 224, the monitoring and control unit controls the shuttle robots to move the objects from the collection point 110 to the transshipment station 120c where the objects are trans-shipped from one trolley, specifically, a distribution trolley 106, onto another trolley, specifically an accumulation trolley 106', that is suitable for carrying a plurality of objects in a stack, and for moving said other trolley loaded with a stack of objects from the transshipment station to the buffer storage zone.

The storage reception stations 140 may be grouped together by function and they may be positioned in rows and columns making up travel aisles for the shuttle robots 142a to 142d occupying storage spaces that are predetermined and dedicated for this use.

In order to facilitate movements of the accumulation trolleys 106' in the storage zone 141, it may be preferable for the containers corresponding to a given batch for palletizing on a single pallet to be distributed among different travel aisles.

In this manner, while a pallet is being loaded in the palletizing station, interference between the accumulation trolleys bringing the objects for loading to the palletizing station can be minimized, thereby making the traffic of shuttle robots that are empty or moving a trolley more fluid.

Alternatively, in particular in a situation where space is lacking, the storage reception stations may be distributed in empty zones instead of being brought together in a single location.

During a step 225, that may take place together with the steps 224, an empty pallet 153a or 153b is unstacked from an empty-pallet waiting position adjacent to the palletizing station, such as one of the unstackers 156a and 156b, and be moved to a loading position 150 in the palletizing station, e.g. by means of a conveyor 157, with this being done in response to the palletizing plan, and in particular to the type of pallet required for the batch that is to be palletized, as determined and instructed by the monitoring and control device 225.

The type of pallet may correspond to a dimension, to a pallet structure, a color, a material (wood, plastics material, metal), a structure (a single-deck pallet, a two-deck pallet, a reversible pallet, a pallet having a peripheral bottom deck, . . . ), or to a combination of one or more of these characteristics.

The type of pallet may be imposed by the type of objects for palletizing or by a request of a recipient or of a transporter, or by the nature of the handling and/or transport operations that are to take place subsequently, and it may therefore be specified as a required pallet type in the object sorting data or it may be deducible from that data, e.g. by means of a table of associations between types of pallet and the above-mentioned criteria.

During a step 227, the objects loaded on an accumulation trolley presented to the palletizing station during the step 224 are stowed on the pallet 153 that has been conveyed to the loading position 150 during step 225, in compliance with the palletizing plan prepared during step 222, and then the unloaded trolley is transferred along a path 41' to a waiting station 119 or to an available storage reception station 140.

Steps 224 and 227 are repeated until all of the objects forming the batch for palletizing have been stowed on the pallet that was put into place during step 225.

FIG. 1E shows the step 227 of loading containers 103 stacked on an accumulation trolley 106' onto a pallet 153 by means of an automatic device 154.

It should be observed that this method is particularly versatile and adaptable since it makes it possible to make up pallets with batches that are not uniform, i.e. batches made up of objects comprising articles 102 of different types and/or containers 103 of different types.

The example shown in FIG. 1E shows a batch that is being palletized made up of stacks of objects 104' and 104" formed by containers of different widths, and possibly objects that are themselves different.

When all of the items in a batch for palletizing have been stowed on the pallet, then the pallet made up during steps 224 and 227 is considered as being complete and it is transferred by a conveyor system 161 along a path 50 to a wrapping station 160 where it is wrapped during a step 230.

During a step 233, the wrapped pallet is sent to a destination, e.g. a storage location in a warehouse, or loaded onto a truck and sent to a delivery address.

The reception stations 119, 130, and/or 140 may be grouped together by function, or they may be dispersed and positioned in such a manner as to occupy spaces that would otherwise not be used but that are not specifically dedicated for this purpose.

Whatever the configuration used for the reception stations, in order to minimize movements in terms of time and distance, and thus minimize the time of use of the shuttle robots, the number of robots, and the floor area occupied by the travel paths taken by the shuttle robots, it is preferable for the distribution reception stations 110 to be closer to the outlets of the production lines 105 than the intermediate reception stations 130 and the storage reception stations 140, for the intermediate reception stations to be closer to the transshipment station 120c than the distribution reception stations and the storage reception stations, and for the storage reception stations to be closer to the pallet loading position 150 than the distribution reception stations and the intermediate reception stations.

The invention claimed is:

1. A method of palletizing objects, in which use is made of shuttle robots suitable for moving trolleys under the control of a monitoring and control unit in order to handle the objects to a palletizing station where the objects are stowed on a pallet, wherein the palletizing station is shared between a plurality of production lines for producing the objects, which objects are packaged in rectangular box shapes, the method comprising the following steps:

using the shuttle robots to move the objects for processing on distribution trolleys from the outlets of the production lines so as to place them in a transshipment station where each object is trans-shipped from a distribution trolley to an accumulation trolley on which the object is stacked on other externally identical rectangular box shaped objects that are to be palletized on the same pallet;

using the shuttle robots under the control of the monitoring and control unit to move the accumulation trolleys full of stacked objects to a buffer storage zone where the identical rectangular box shaped objects on the accumulation trolley are grouped together by batches in shuttle robot travel aisles, the objects of a batch being for stowing on the same pallet; and preparing a palletizing plan by means of the monitoring and control unit when it is detected that all of the objects making up a batch to be palletized are stacked on one or more accumulation trolleys situated in the buffer storage zone, and once said palletizing plan, has been prepared, moving said accumulation trolleys carrying the objects of the batch for palletizing from the buffer storage zone in order to stow them on a pallet.

2. The method according to claim 1, where said objects are articles packaged in boxes at each collection point.

3. The method according to claim 1, wherein:

pallets of different types are placed in a pallet waiting position adjacent to the palletizing station;

in accordance with sorting data, the monitoring and control unit determines type of pallet that is adapted to palletizing a batch of objects on a pallet; and in response to that detection, the monitoring and control unit instructs a pallet corresponding to the determined pallet type to be moved from the pallet waiting position to a pallet loading position of the palletizing station.

4. The palletizing method according to claim 1, wherein:
said objects are handled by the shuttle robots between a plurality of collection points adjacent to said production lines and the palletizing station, which is common to said collection points;
in that the monitoring and control unit controls the shuttle robots to move the objects from a collection point to a transshipment station where the objects are transshipped from one trolley onto another trolley suitable for carrying a plurality of objects in a stack; and
in that the monitoring and control unit controls the shuttle robots to move said other trolleys loaded with respective stacks of objects from the transshipment station to the buffer storage zone.

5. The method according to claim 4, wherein:
pallets of different types are placed in a pallet waiting position adjacent to the palletizing station;
in accordance with sorting data, the monitoring and control unit determines a type of pallet that is adapted to palletizing a batch of objects on a pallet; and
in response to that detection, the monitoring and control unit instructs a pallet corresponding to the determined pallet type to be moved from the pallet waiting position to a pallet loading position of the palletizing station.

6. The method according to claim 4, wherein said objects are articles packaged in boxes at each collection point.

7. The method according to claim 6, wherein:
pallets of different types are placed in a pallet waiting position adjacent to the palletizing station;
in accordance with sorting data, the monitoring and control unit determines a type of pallet that is adapted to palletizing a batch of objects on a pallet; and
in response to that detection, the monitoring and control unit instructs a pallet corresponding to the determined pallet type to be moved from the pallet waiting position to a pallet loading position of the palletizing station.

* * * * *